US010106387B2

(12) United States Patent
Morita (10) Patent No.: US 10,106,387 B2
(45) Date of Patent: Oct. 23, 2018

(54) INDUSTRIAL VEHICLE

(71) Applicant: KABUSHIKI KAISHA TOYOTA JIDOSHOKKI, Kariya-shi, Aichi-ken (JP)

(72) Inventor: Junichi Morita, Aichi-ken (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 402 days.

(21) Appl. No.: 15/291,281

(22) Filed: Oct. 12, 2016

(65) Prior Publication Data

US 2017/0101296 A1 Apr. 13, 2017

(30) Foreign Application Priority Data

Oct. 13, 2015 (JP) .................. 2015-202265

(51) Int. Cl.
| | |
|---|---|
| *B66F 9/22* | (2006.01) |
| *B60T 13/14* | (2006.01) |
| *B60T 13/20* | (2006.01) |
| *B66F 9/24* | (2006.01) |
| *F15B 1/033* | (2006.01) |
| *F15B 15/20* | (2006.01) |
| *B60T 13/66* | (2006.01) |

(Continued)

(52) U.S. Cl.
CPC ................ *B66F 9/22* (2013.01); *B60T 13/14* (2013.01); *B60T 13/148* (2013.01); *B60T 13/20* (2013.01); *B60T 13/662* (2013.01); *B60T 13/686* (2013.01); *B66F 9/07509* (2013.01); *B66F 9/24* (2013.01); *F15B 1/033* (2013.01); *F15B 15/20* (2013.01); *B60T 2270/88* (2013.01); *F15B 2015/206* (2013.01)

(58) Field of Classification Search
CPC .. F15B 1/04; F15B 11/17; F15B 13/06; F15B 1/033; B66F 9/22
See application file for complete search history.

(56) References Cited

U.S. PATENT DOCUMENTS

| | | | | |
|---|---|---|---|---|
| 2012/0060777 | A1* | 3/2012 | Tikkanen ................ | F01P 7/044 123/41.11 |
| 2014/0144130 | A1* | 5/2014 | Vigholm ................ | E02F 9/2207 60/327 |
| 2014/0212305 | A1* | 7/2014 | Krittian .................... | B66F 9/22 417/364 |

FOREIGN PATENT DOCUMENTS

JP    2002-114499 A    4/2002

* cited by examiner

*Primary Examiner* — Thomas E Lazo
(74) *Attorney, Agent, or Firm* — Sughrue Mion, PLLC (57) ABSTRACT

An industrial vehicle includes a hydraulically-operated brake device, a hydraulically-operated loading device, an electric motor, a hydraulic pump, a first hydraulic circuit having an accumulator and a detector for detecting pressure accumulated in the accumulator, a first oil passage connecting the first hydraulic circuit and the hydraulic pump, a load handling device, a second hydraulic circuit having a closed center control valve, a second oil passage connecting the second hydraulic circuit and the hydraulic pump, an oil tank, a pressure compensating circuit, a pilot passage, and a controller. When a selector valve is placed in a first position, hydraulic pressure generated by the hydraulic pump is transmitted to a pressure compensating valve in such a direction that disconnects the hydraulic pump from the oil tank to thereby create in the first oil passage hydraulic pressure that causes the accumulator pressure accumulation.

5 Claims, 5 Drawing Sheets

(51) Int. Cl.
*B60T 13/68* (2006.01)
*B66F 9/075* (2006.01)

INDUSTRIAL VEHICLE

BACKGROUND OF THE INVENTION

The present invention relates to an industrial vehicle having a hydraulically-operated braking device and a hydraulically-operated loading device.

Japanese Patent Application Publication No. 2002-114499 discloses a forklift truck as an industrial vehicle having a hydraulically-operated device. In the forklift truck according to the above Publication, hydraulic pressure is accumulated in an accumulator and such pressure is released to operate the hydraulic device. The hydraulic mechanism of the forklift truck includes an open center control valve that provides fluid communication between an hydraulic pump and an oil tank when there is no instruction for operating loading device of the forklift truck. The provision of such an open center control valve allows hydraulic pressure to be accumulated in the accumulator by driving the hydraulic pump in the absence of instruction for operating the loading device.

In recent years, in order to reduce the difference in load handling speed between working with no load and working with maximum load, it has been contemplated to use a hydraulic mechanisms having a closed center control valve which blocks the fluid communication between the hydraulic pump and the loading device in the absence of instruction for operating the loading device. The hydraulic mechanism having the closed center control valve also has a pressure compensating valve. The pressure compensating valve compensates for the operating pressure for hydraulic cylinder for operating the loading device and also releases the pressure in the oil tank when the pressure of a circuit exceeds the relief pressure. In the hydraulic mechanism having the closed center control valve, driving the hydraulic pump in the absence of an instruction for operating the loading device does not cause the accumulator to operate for accumulation because the pressure in the circuit is released in the tank through the pressure compensating valve. Therefore, in using a hydraulic mechanism having a closed center control valve, the configuration in which pressure is accumulated in the accumulator needs to be reconsidered.

The present invention which has been made in light of the problems described above is directed to providing an industrial vehicle in which accumulated pressure in an accumulator is maintained properly.

SUMMARY OF THE INVENTION

In accordance with one aspect of the present invention, there is provided an industrial vehicle including a hydraulically-operated brake device, a hydraulically-operated loading device, an electric motor, a hydraulic pump driven by the electric motor, a first hydraulic circuit having an accumulator serving as a hydraulic pressure source for the brake device and a detector for detecting pressure accumulated in the accumulator, a first oil passage connecting the first hydraulic circuit and the hydraulic pump, a load handling device, a second hydraulic circuit having a closed center control valve that is configured to shut off communication between the hydraulic pump and the loading device when the load handling device is not operated, the control valve being configured to supply or release hydraulic oil so that the loading device performs load operation, a second oil passage connecting the second hydraulic circuit and the hydraulic pump, an oil tank, a pressure compensating circuit having a third oil passage, a pressure compensating valve provided in the third oil passage, a fourth oil passage and a selector valve provided in the fourth oil passage, the third oil passage connecting the hydraulic pump and the oil tank without passing through the second hydraulic circuit, the fourth oil passage connecting the hydraulic pump and the pressure compensating valve, a pilot passage through which pressure accumulated in the accumulator is transmitted to the selector valve as pilot pressure, and a controller. In response to the pilot pressure, the selector valve is changed between a first position in which hydraulic pressure produced by the hydraulic pump is transmitted to the pressure compensating valve and a second position in which transmission of the hydraulic pressure produced by the hydraulic pump to the pressure compensating valve is blocked. When pressure in the accumulator is less than a predetermined value, the selector valve is placed in the first position. When pressure in the accumulator is less than a predetermined value and in response to detection result of the detector, the controller determines that pressure in the accumulator needs to be accumulated, the controller controls the electric motor to drive the hydraulic pump. When the selector valve is placed in the first position, hydraulic pressure generated by the hydraulic pump is transmitted to the pressure compensating valve in such a direction that disconnects the hydraulic pump from the oil tank to thereby create in the first oil passage hydraulic pressure that causes the accumulator pressure accumulation.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE EMBODIMENTS

Figure 1:
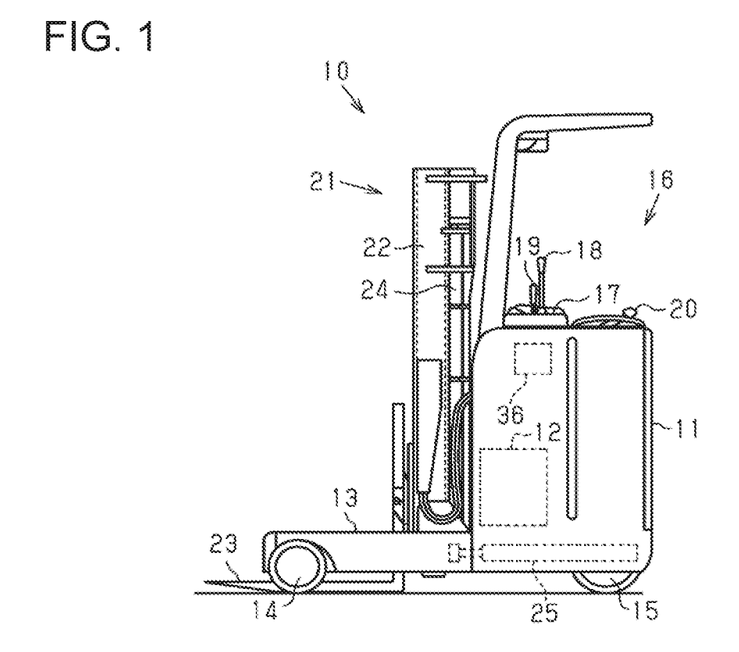
FIG. 1 is a side view of a forklift truck according to an embodiment of the present invention.

The following will describe an industrial vehicle according to an embodiment of the present invention with reference to FIGS. 1 through 5. As shown in FIG. 1, the forklift truck 10 as an industrial vehicle is a reach type three-wheeled vehicle having a pair of right and left reach legs 13, one driven rear wheel 15, and a pair of right and left idle front wheel 14. The forklift truck 10 is powered by a battery 12 which is accommodated in the front part of a body 11 of the forklift truck 10. The body 11 includes the paired right and left reach legs 13 extending forward. The front wheels 14 are rotatably supported in the front parts of reach rails of the paired legs 13. The single rear wheel 15 is a steerable drive wheel and, though not shown specifically in FIG. 1, disposed at a position that is offset leftward from width center line of the vehicle body 11 as seen in the forward moving direction of the forklift truck 10. A caster (not shown) as an auxiliary wheel is provided on the right side of and spaced at a predetermined distance from the rear wheel 15.

A cabin 16 for a stand-up rider is provided in the rear part of the body 11. An instrument panel 17 is provided in the front part of the cabin 16 and includes various load control levers 18 as the load handling control and an accelerator control lever 19 for controlling traveling forward or rearward. A steering wheel 20 is provided in the cabin 16. The load control levers 18 includes a lift control lever 18A, a reach control lever 18B, and a tilt control lever 18C.

A hydraulically-operated loading device (or mast assembly) 21 is provided on the front side of the body 11 and includes a two-stage mast assembly 22 and a fork 23. The body 11 has therein a plurality of cylinders for driving the loading device 21. The cylinders include a lift cylinder 24 moving the mast assembly 22 in the up and down direction, a reach cylinder 25 moving the mast assembly 22 in the front and rear direction within a predetermined stroke, and a tilt cylinder 26 (shown in FIG. 2) tilting the mast assembly 22 in the front and rear direction.

Figure 2:
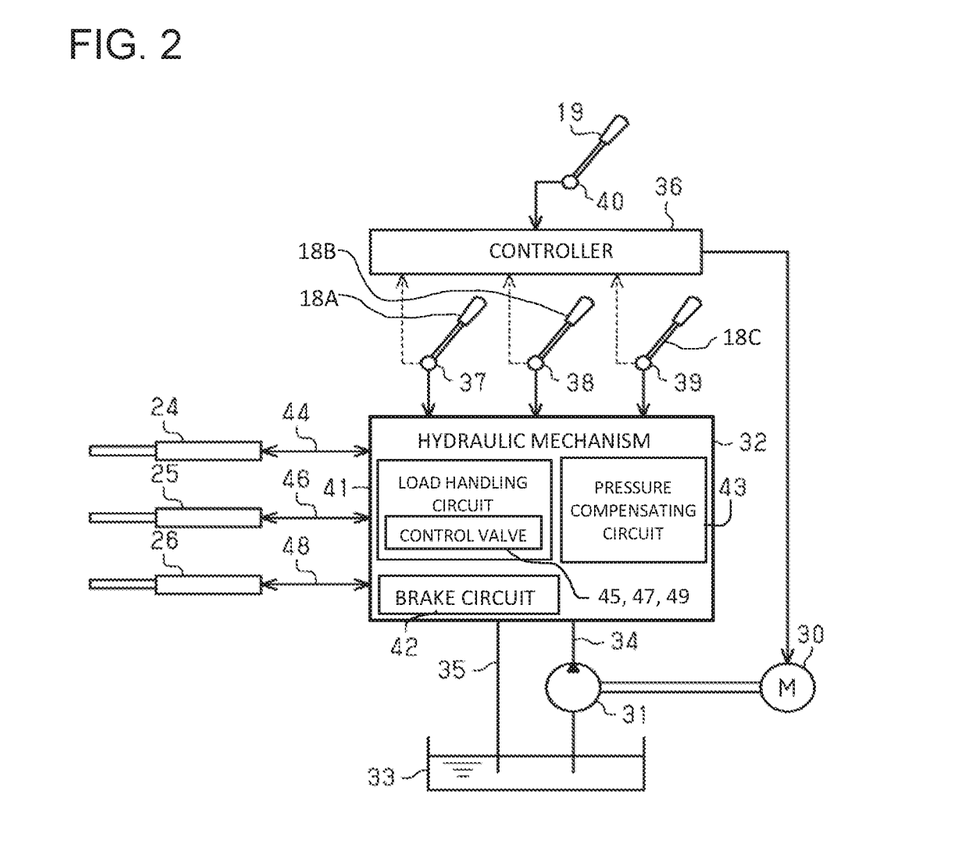
FIG. 2 is a schematic view of a hydraulic mechanism of the forklift truck of FIG. 1.

As shown in FIG. 2, the body 11 has therein an electric loading motor 30 as a driving source for load handling, a hydraulic pump 31 driven by the loading motor 30, and a hydraulic mechanism 32 supplied with hydraulic oil from the hydraulic pump 31. The hydraulic mechanism 32 controls the supply or release of hydraulic oil to the cylinders 24, 25, 26. An oil passage 34 is connected between the hydraulic pump 31 and the hydraulic mechanism 32 through which hydraulic oil pumped from an oil tank 33 by the hydraulic pump 31 is supplied to the hydraulic mechanism 32. An oil passage 34 is connected between the hydraulic mechanism 32 and the oil tank 33 through which hydraulic oil is returned from the hydraulic mechanism 32 to the oil tank 33.

A controller 36 as a control device is provided in the body 11. The controller 36 controls the operation of the loading motor 30 and hence of the hydraulic pump 31. A plurality of sensors is for detecting the position of the load control levers 18 is electrically concerned to the controller 36. The sensors include a lift sensor 37 detecting the position of the lift control lever 18A, a reach sensor 38 detecting the position of the reach control lever 18B, and a tilt sensor 39 detecting the position of the tilt control lever 18C. The lift control lever 18A instructs lift operation (operation of the mast assembly 22 in vertical direction). The reach control lever 18B instructs reach operation (operation of the mast assembly 22 in the horizontal direction). The tilt control lever 18C instructs tilt operation (tilting operation of the mast assembly 22 in horizontal direction). An accelerator sensor 40 for detecting the position of the accelerator control lever 19 is electrically connected to the controller 36.

The following will describe the hydraulic mechanism 32. The hydraulic mechanism 32 includes a load handling circuit 41 as the second hydraulic circuit of the present invention, a brake circuit 42 as the first hydraulic circuit of the present invention, and a pressure compensating circuit 43.

The load handling circuit 41 controls the hydraulic pressure for driving the loading device 21. The load handling circuit 41 includes a lift control valve 45 connected through an oil passage 44 to an oil chamber of the lift cylinder 24, a reach control valve 47 connected through an oil passage 46 to an oil chamber of the reach cylinder 25, and a tilt control valve 49 connected through an oil passage 48 to an oil chamber of the tilt cylinder 26. Each control valve 45, 47, 49 is connected to the oil passages 34 that is connected to the hydraulic pump 31 and also to the oil passage 35 that connected to the oil tank 33. The oil passage 34 serves as the second oil passage of the present invention connecting the hydraulic pump 31 and the load handling circuit 41.

The lift control lever 18A is mechanically connected to the control valve 45. The operation of the lift control lever 18A opens or closes the control valve 45. The reach control lever 18B is mechanically connected to the control valve 47. The operation of the reach control lever 18B opens or closes the control valve 47. The tilt control lever 18C is mechanically connected to the control valve 49. The operation of the tilt control lever 18C opens or closes the control valve 49.

Each control valve 45, 47, 49 according to the present embodiment is the closed center type according to which the loading device 21 is shut off from communication with the hydraulic pump 31 when none of the load control levers 18 is operated. In the load handling circuit 41, when any one of the load control levers 18 is operated, its corresponding control valve 45, 47, 49 is opened to supply hydraulic oil from the hydraulic pump 31 and the loading device 21 is driven, accordingly. For example, when the reach control lever 18B is operated, hydraulic oil is supplied from the hydraulic pump 31 to the reach cylinder 25 through the oil passage 46 connected to the oil chamber of the control valve 47.

The brake circuit 42 controls the hydraulic pressure for driving auxiliary brake devices 50, 51 (shown in FIG. 3) which are mounted to the right and left front wheels 14. A main brake device, which is not shown in the drawing and separate from the auxiliary brake devices 50, 51 is provided in the forklift truck 10. The main brake device is a rear wheel brake device for braking the rear wheel 15, while the auxiliary brake devices 50, 51 are rear wheel brake devices for braking the front wheels 14. In the forklift truck 10, when the main brake device brakes the rear wheel 15, the controller 36 determines whether or not braking of the front wheels 14 by the auxiliary brake devices 50, 51 is needed and, if it is determined by the controller 36 that the auxiliary brake devices 50, 51 need to brake the front wheels 14, the auxiliary brake devices 50, 51 are operated. The pressure compensating circuit 43 controls the hydraulic pressure in the hydraulic mechanism 32.

Figure 3:
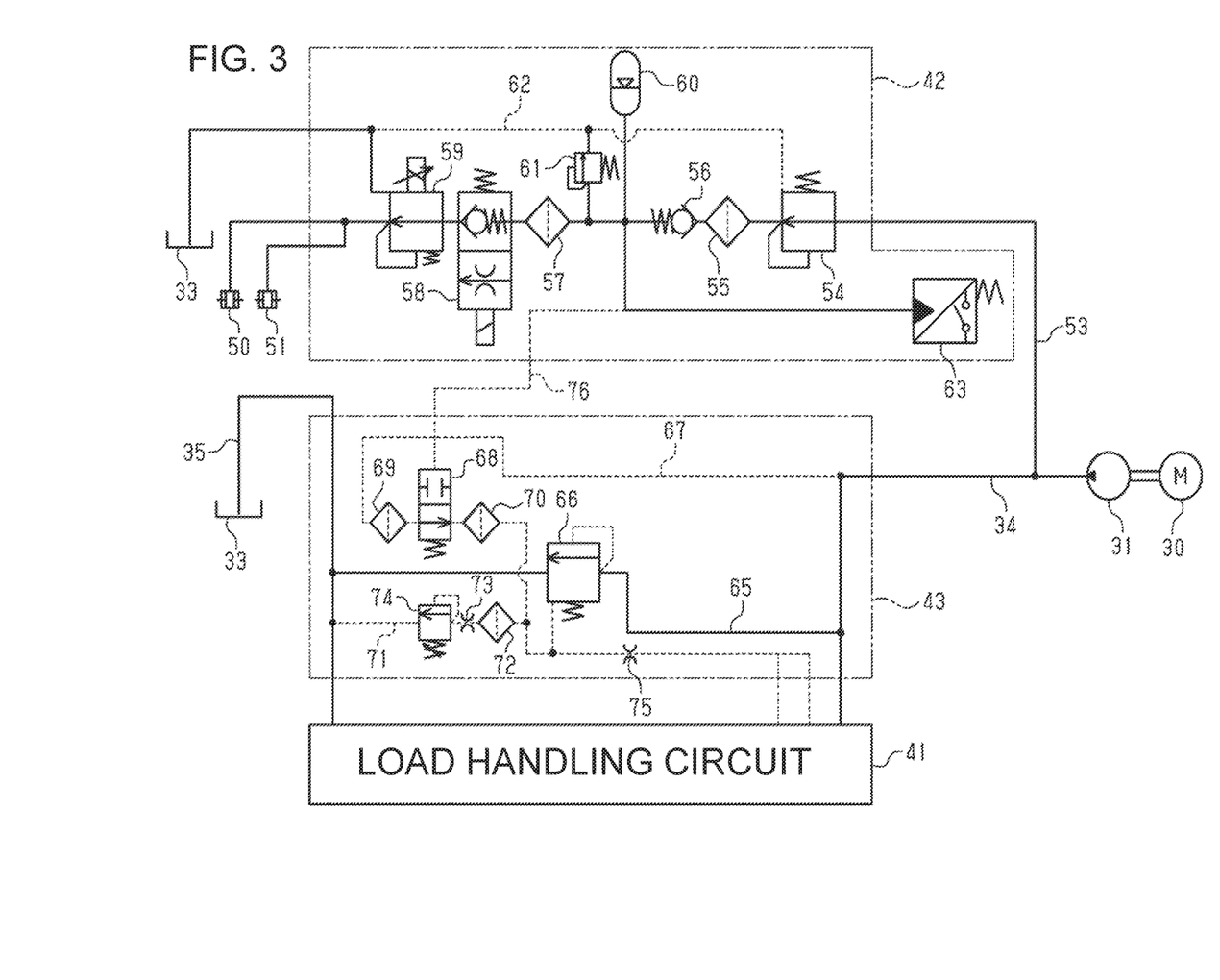
FIG. 3 is a hydraulic circuit diagram showing a pressure compensating circuit and a brake circuit of the forklift truck of FIG. 1.

Referring to FIG. 3, the following will describe the brake circuit 42 and the pressure compensating circuit 43.

The brake circuit 42 has an oil passage 53 connected to the auxiliary brake devices 50, 51. The oil passage 53 is also connected to the hydraulic pump 31, thus serving as the first oil passage of the present invention connecting the hydraulic pump 31 and the brake circuit 42. In the oil passage 53, a pressure reducing valve 54, a filter 55, a check valve 56, a filter 57, an electromagnetic valve 58, and a pressure reducing valve 59 are provided in this order from the side of the hydraulic pump 31. An accumulator 60 is connected to the oil passage 53 downstream of the check valve 56. The accumulator 60 serves as a hydraulic pressure source for the auxiliary brake devices 50, 51 and accumulates hydraulic pressure for driving the auxiliary brake devices 50, 51. A relief valve 61 is connected to the oil passage 53 downstream of the connection of the accumulator 60 to the oil passage 53. The pressure reducing valves 54, 59 and the relief valve 61 are connected also to an oil passage 62 which is connected to the oil tank 33 so that hydraulic oil is returned to the oil tanks 33 transmitting through the pressure reducing valves 54, 59 and the relief valve 61.

The brake circuit 42 has a switch 63 for detecting the accumulated pressure of the accumulator 60. The switch 63 serves as the detector of the present invention. The switch 63 has two positions, namely first position and second position to which the switch 63 is selectively placed according to the accumulated pressure of the accumulator 60. Information regarding the position of the switch 63 is transmitted to the controller 36. In the present embodiment, the switch 63 is placed in the first position, for example, open state of the switch 63 when the accumulated pressure in the accumulator 60 is at a predetermined level or higher, and in the second position, for example close state of the switch 63 when the accumulated pressure is lower than the above predetermined level. It is noted that the pressure of the above predetermined level is a pressure that is necessary for operating the hydraulic auxiliary brake devices 50, 51 properly.

The following will describe the pressure compensating circuit 43. The pressure compensating circuit 43 includes an oil passage 65 that is connected at one end thereof to the oil tank 33 and at the other end thereof to the hydraulic pump 31 for connection between the hydraulic pump 31 and the oil tank 33 without passing through the load handling circuit 41. The oil passage 65 serves as the third oil passage of the present invention. A pressure compensating valve 66 is provided in the oil passage 65. The pressure compensating valve 66 generates a pressure that is higher than the pressure of hydraulic oil transmitted from the hydraulic pump 31 to the load handling circuit 41 so that hydraulic pressure in the load handling circuit 41 is maintained at a level that is required for the loading device 21 to operate properly. The pressure compensating valve 66 provides fluid communication between the hydraulic pump 31 and the oil tank 33 to release the pressure to the oil tank 33 when the pressure of the circuit exceeds a predetermined relief pressure value.

The pressure compensating circuit 43 includes an oil passage 67 for connecting the hydraulic pump 31 and the pressure compensating valve 66. The oil passage 67 serves as the fourth oil passage of the present invention. A selector valve 68 is provided between the hydraulic pump 31 and the pressure compensating valve 66 in the oil passage 67. The selector valve 68 has the first position for communication of the hydraulic pump 31 with the pressure compensating valve 66 and the second position for disconnecting the fluid communication between the hydraulic pump 31 and the pressure compensating valve 66. In the first position of the selector valve 68, the hydraulic pressure produced by the hydraulic pump 31 is transmitted through the oil passage 67 to the pressure compensating valve 66. In the second position of the selector valve 68, on the other hand, the transmission of the hydraulic pressure to the pressure compensating valve 66 is blocked. In the present embodiment, when the selector valve 68 is placed in the first position, hydraulic pressure of the hydraulic pump 31 serves so that the oil passage 65 is closed by the pressure compensating valve 66. That is, the hydraulic pressure is applied to the pressure compensating valve 66 as a force that acts in such a direction that shuts off the communication between the hydraulic pump 31 and the oil tank 33.

Filters 69, 70 are provided on upstream side and on the downstream side of the selector valve 68, respectively, in the oil passage 67. The pressure compensating circuit 43 includes an oil passage 71, one end of which is connected to the oil passage 67 between the selector valve 68 and the pressure compensating valve 66 and the other end of which is connected to the oil passage 35. A filter 72, an orifice 73, and a relief valve 74 are connected in the oil passage 71. An orifice 75 is provided in the oil passage 67 at a position that is more adjacent to the load handling circuit 41 than the pressure compensating valve 66.

In the present embodiment, the hydraulic mechanism 32 includes a pilot passage 76 through which pressure accumulated in the accumulator 60 is transmitted to the selector valve 68 as the pilot pressure. The selector valve 68 is changed between the first position and the second position in response to the pilot pressure. Specifically, when the pressure accumulated in the accumulator 60 exceeds a predetermined value, the selector valve 68 is turned to the second position against the urging force of its spring by the pilot pressure. On the other hand, when pressure accumulated in the accumulator 60 is less than the above predetermined value, the selector valve 68 is turned to the first position by the spring force then exceeding the pilot pressure. That is, the selector valve 68 is a pilot valve. When the pilot force against the urging force of its spring exceeds a predetermined value, the selector valve 68 turned from the first position to the second position.

Figure 4A:
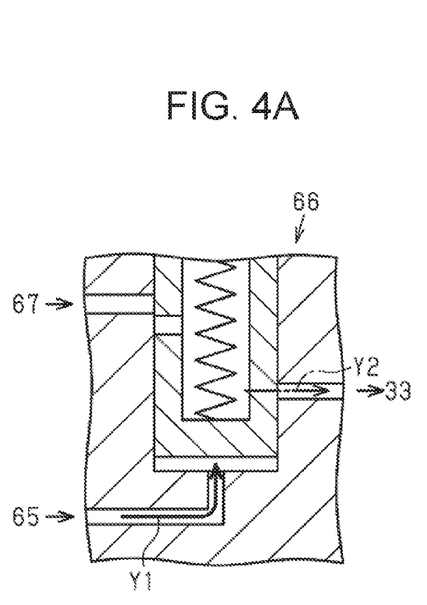
FIG. 4A and FIG. 4B are schematic views illustrating the operation of the pressure compensating valve of FIG. 3.
Figure 4B:
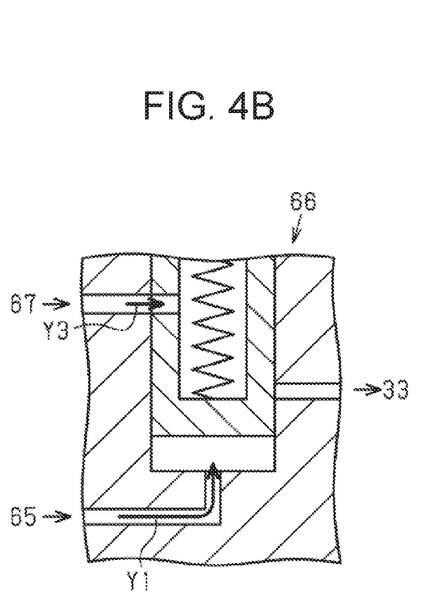
Figure 5:
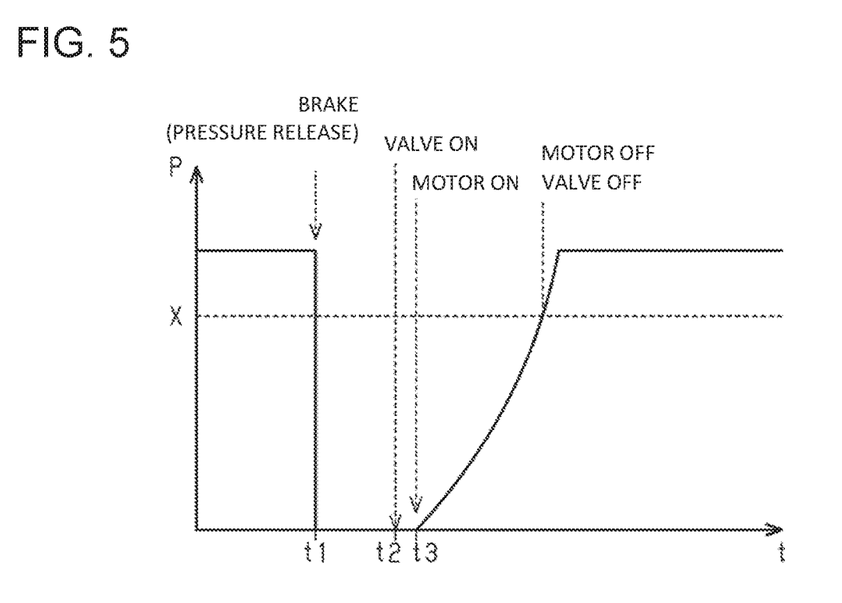
FIG. 5 is a chart showing changes of accumulated pressure in the accumulator of the forklift truck of FIG. 1.

The following will describe the operation of the hydraulic mechanism 32 and specifically, the operation of the brake circuit 42 and the pressure compensating circuit 43 in the forklift truck 10 according to the present embodiment with reference to FIGS. 3 to 5. In the operation of the loading device 21, the controller 36 controls the loading motor 30 and the hydraulic pump 31 is driven accordingly so as to operate the loading device 21 at a speed corresponding to the operating amount of the load control lever 18. Hydraulic pressure thus generated by the hydraulic pump 31 is transmitted to the load handling circuit 41 and each control valve 45, 47, 49 is actuated to supply or release hydraulic oil so that the loading device 21 performs desired load operation. Hydraulic pressure generated by the hydraulic pump 31 also is transmitted through the oil passage 53 to the brake circuit 42 and accumulated in the accumulator 60. The pressure accumulated in the accumulator 60 is prevented by the check valve 56 from transmitting reversely to the hydraulic pump 31 through the oil passage 53. Then, the selector valve 68 in the pressure compensating circuit 43 is placed in the second position by the pilot pressure applied through the pilot passage 76 from the accumulator 60. During the operation of the loading device 21, it is so controlled that pressure is not applied to the pressure compensating valve 66 through the oil passage 67.

Referring to FIG. 4A showing the operation of the pressure compensating valve 66 when the selector valve 68 in the pressure compensating circuit 43 is placed in the second position, the pressure compensating valve 66 receives pressure through the oil passage 65, as indicated by the arrow Y1. When pressure below the relief pressure is applied to the pressure compensating valve 66, pressure is generated by pressure and spring force from a hydraulic cylinder transmitted through an oil passage that is not shown in the drawing and higher than pressure applied to the load handling circuit 41. On the other hand, when pressure that is greater than the relief pressure is applied to the pressure compensating valve 66 through the oil passage 65, the oil passage 65 is opened so that the hydraulic pump 31 communicates with the oil tank 33. In opening the oil passage 65, the plunger in the pressure compensating valve 66 that is located so as to disconnect the hydraulic pump 31 from the oil tank 33 is moved upward in FIG. 4A so as to provide communication between the hydraulic pump 31 and the oil tank 33. Thus, the pressure applied to the pressure compensating valve 66 through the oil passage 65 is released to the oil tank 33, as indicated by the arrow Y2.

When braking the forklift truck 10, the rear brake device is mainly used. However, when a slip of the rear wheel 15 is detected, the auxiliary brake devices 50, 51 are also used braking. Then, the controller 36 actuates the electromagnetic valve 58 so as to release the pressure accumulated in the accumulator 60. Thus, the pressure from the accumulator 60 is transmitted to the auxiliary brake devices 50, 51 and the auxiliary brake devices 50, 51 are operated for braking of the forklift truck 10.

If the auxiliary brake devices 50, 51 are operated repeatedly while the loading device 21 is not in operation, the accumulated pressure in the accumulator 60 becomes insufficient. If the accumulated pressure is decreased to be less than a predetermined pressure, the pilot pressure applied to the selector valve 68 through the pilot passage 76 is reduced, with the result that the selector valve 68 is turned from the second position to the first position. In the first position of the selector valve 68, the oil passage 67 is opened, that is the hydraulic pump 31 is made to communicate with the pressure compensating valve 66.

When the accumulated pressure in the accumulator 60 is reduced less than the predetermined pressure and the switch 63 is turned from the second position to the first position, a signal is sent to the controller 36. In response to the signal issued, the controller 36 determines that pressure needs to be accumulated and causes the accumulator 60 to accumulate pressure. That is, the controller 36 causes the loading motor 30 to drive the hydraulic pump 31 while the load control lever 18 is not in operation. Thus, the pressure generated by the hydraulic pump 31 is applied to the pressure compensating valve 66 through the oil passage 67.

Referring to FIG. 4B showing operation of the pressure compensating valve 66 when the selector valve 68 of the pressure compensating circuit 43 is placed in the first position, pressure is applied to the pressure compensating valve 66 through the oil passage 65 as indicated by the arrow Y1 and also through the oil passage 67 as indicated by the arrow Y3. That is, the pressure applied as indicated by the arrow Y3 is applied to the pressure compensating valve 66 as force acting in such a direction that disconnects the hydraulic pump 31 from the oil tank 33, or as force that causes the oil passage 65 to be closed. Thus, the pressure from the hydraulic pump 31 is not released to the oil tank 33 and the pressure in the oil passage 34 is increased. As a result of the operation of the pressure compensating circuit 43, hydraulic pressure is created in the oil passage 53 in the hydraulic mechanism 32 connected to the brake circuit 42. This hydraulic pressure is used for pressure accumulation in the accumulator 60 while the loading device 21 is not in operation. That is, the hydraulic pressure that is necessary for operating the auxiliary brake devices 50, 51 is accumulated in the accumulator 60.

Referring to FIG. 5, when the auxiliary brake devices 50, 51 are operated by the pressure that is accumulated in the accumulator 60 and high enough to operate the auxiliary brake devices 50, 51, the pressure in the accumulator 60 is released at time t1. As a result, the pressure accumulated in the accumulator 60 is reduced. As the pressure is reduced less than a determined level X, the selector valve 68 is turned to the first position, as indicated by VALVE ON at time t2. The accumulation of the accumulator 60 is detected by the switch 63. In response to a detection signal from the switch 63, the controller 36 causes the loading motor 30 to be operated, as indicated by MOTOR ON, at time t3. Accordingly, pressure is generated in the oil passage 53 connected to the brake circuit 42 and pressure is accumulated in the accumulator 60. As the pressure is accumulated in the accumulator 60, the selector valve 68 is turned to the second position, as indicated by VALVE OFF. When the pressure accumulation has been completed, the controller 36 stops the loading motor 30, as indicated by MOTOR OFF.

The present embodiment offers the following advantageous effects.

(1) When pressure accumulation needs to be made by the accumulator 60, the hydraulic pump 31 can be made to communicate with the pressure compensating valve 66 by the operation of the selector valve 68. Therefore, hydraulic pressure generated by the hydraulic pump 31 is applied to the pressure compensating valve 66 as a force acting in a direction that disconnects the hydraulic pump 31 from the oil tank 33 without being released to the oil tank 33 through the pressure compensating valve 66. As a result, hydraulic pressure is generated in the oil passage 53 that connects the hydraulic pump 31 and the brake circuit 42 including the accumulator 60 and can be used for pressure accumulation in the accumulator 60. Therefore, the pressure accumulation of the accumulator 60 is maintained well.

(2) In the hydraulic mechanism 32 including the closed center control valves 45, 47, 49 and the pressure compensating valve 66, the pressure accumulation of the accumulator 60 is maintained well, so that the auxiliary brake devices 50, 51 are operated properly.

(3) Especially, in case of no operation of the loading device 21, the accumulation of the accumulator 60 can be maintained well and the auxiliary brake devices 50, 51 can be operated properly.

(4) The use of the switch 63 that directly detects the pressure of the accumulator 60 allows the accumulator 60 to operate for accumulation at proper timing.

(5) The provision of the check valve 56 on the upstream side of the junction of the accumulator 60 in the brake circuit 42 helps to maintain the accumulated pressure in the accumulator 60 properly.

(6) Stopping the loading motor 30 with pressure at a predetermined level accumulated in the accumulator 60, consumption of electric power may be saved.

(7) The use of the selector valve 68 which is mechanically controlled to operate in response to a pilot pressure helps to reduce the cost of the forklift truck 10 as compared to the use of an electrically controlled selector valve.

The present embodiment may be modified variously as follows. A detector determining whether or not the auxiliary brake devices 50, 51 are operated may be used for detecting the accumulation of the accumulator 60. By detecting the operation of the auxiliary brake devices 50, 51, pressure accumulation of the accumulator 60 may be detected indirectly. Therefore, it may be so configured that, when the auxiliary brake devices 50, 51 are operated, the controller 36 performs the same controlling for pressure accumulation as in the present embodiment.

The switch 63 for detecting the accumulated pressure of the accumulator 60 may be replaced with a pressure sensor. The detection result of the pressure sensor is transmitted to the controller 36, which determines whether or not the desired pressure is accumulated in the accumulator 60 and controls the loading motor 30 accordingly.

Though the selector valve 68 is turned to the second position when pressure is accumulated in the accumulator, the loading motor 30 may be operated continuously. The timing at which the selector valve 68 is turned to the first position and the timing at which the loading motor 30 is operated may occur simultaneously.

It may be so configured that the selector valve 68 is turned to the first position from the second position for pressure accumulation when the accumulator 60 needs to operate for pressure accumulation during the operation of the loading devices 21.

When the accumulator 60 needs to operate for pressure accumulation and the loading device 21 is not in operation, the controller 36 may cause the loading motor 30 to operate for pressure accumulation by the accumulator 60.

The loading device may include a loading attachment. Electromagnetically-operated valves may be used for the control valves 45, 47, 49 in the load handling circuit 41.

The load handling control may be of a button type instead of the load control lever 18. The present invention is applicable to any forklift trucks having a hydraulically-operated brake device, other than the reach type forklift truck as described with reference to the above embodiment.

What is claimed is:

1. An industrial vehicle comprising:
a hydraulically-operated brake device;
a hydraulically-operated loading device;
an electric motor;
a hydraulic pump driven by the electric motor;
a first hydraulic circuit having an accumulator serving as a hydraulic pressure source for the brake device and a detector for detecting pressure accumulated in the accumulator;
a first oil passage connecting the first hydraulic circuit and the hydraulic pump;
a load handling device;
a second hydraulic circuit having a closed center control valve that is configured to shut off communication between the hydraulic pump and the loading device when the load handling device is not operated, the control valve being configured to supply or release hydraulic oil so that the loading device performs load operation;
a second oil passage connecting the second hydraulic circuit and the hydraulic pump;
an oil tank;
a pressure compensating circuit having a third oil passage, a pressure compensating valve provided in the third oil passage, a fourth oil passage and a selector valve provided in the fourth oil passage, the third oil passage connecting the hydraulic pump and the oil tank without passing through the second hydraulic circuit, the fourth oil passage connecting the hydraulic pump and the pressure compensating valve;
a pilot passage through which pressure accumulated in the accumulator is transmitted to the selector valve as pilot pressure; and
a controller,
wherein in response to the pilot pressure, the selector valve is changed between a first position in which hydraulic pressure produced by the hydraulic pump is transmitted to the pressure compensating valve and a second position in which transmission of the hydraulic pressure produced by the hydraulic pump to the pressure compensating valve is blocked, wherein when pressure in the accumulator is less than a predetermined value, the selector valve is placed in the first position, wherein when pressure in the accumulator is less than a predetermined value and in response to detection result of the detector, the controller determines that pressure in the accumulator needs to be accumulated, the controller controls the electric motor to drive the hydraulic pump, and wherein when the selector valve is placed in the first position, hydraulic pressure generated by the hydraulic pump is transmitted to the pressure compensating valve in such a direction that disconnects the hydraulic pump from the oil tank to thereby create in the first oil passage hydraulic pressure that causes the accumulator pressure accumulation.

2. The industrial vehicle according to claim 1, wherein in response to detection result of the detector, the controller detects pressure accumulated in the accumulator.

3. The industrial vehicle according to claim 1, wherein the first hydraulic circuit further includes a check valve to maintain accumulated pressure in the accumulator.

4. The industrial vehicle according to claim 1, wherein when hydraulic pressure is accumulated in the accumulator, the selector valve is turned to the second position and the controller stops the electric motor.

5. The industrial vehicle according to claim 1, wherein the industrial vehicle is a reach type forklift truck, and wherein the brake device is configured to brake front wheels of the reach type forklift truck.

* * * * *